US012736685B2

(12) United States Patent
Ren et al.

(10) Patent No.: US 12,736,685 B2
(45) Date of Patent: Sep. 15, 2026

(54) DRIFT OPTIMIZATION SYSTEMS FOR VEHICLE-MOUNTED MACHINES BASED ON GLOBAL POSITIONING SYSTEMS

(71) Applicant: ANHUI JIAOXIN TECHNOLOGY CO., LTD., Hefei (CN)

(72) Inventors: Zihui Ren, Hefei (CN); Lei Liu, Hefei (CN); Shuai Zhang, Hefei (CN); Hongbang Liang, Hefei (CN); Peisong Cao, Hefei (CN); Zheng Wang, Hefei (CN); Guang Yang, Hefei (CN); Fangsu Chen, Hefei (CN); Lei Wang, Hefei (CN); Dan Zhang, Hefei (CN); Qijun He, Hefei (CN)

(73) Assignee: ANHUI JIAOXIN TECHNOLOGY CO., LTD., Hefei (CN)

( * ) Notice: Subject to any disclaimer, the term of this patent is extended or adjusted under 35 U.S.C. 154(b) by 171 days.

(21) Appl. No.: 18/800,023

(22) Filed: Aug. 10, 2024

(65) Prior Publication Data

US 2025/0085438 A1 Mar. 13, 2025

(30) Foreign Application Priority Data

Sep. 8, 2023 (CN) ........................ 202311157201.8

(51) Int. Cl.
*G01S 19/37* (2010.01)
*G01S 19/14* (2010.01)
*G01S 19/48* (2010.01)

(52) U.S. Cl.
CPC .............. *G01S 19/37* (2013.01); *G01S 19/14* (2013.01); *G01S 19/485* (2020.05)

(58) Field of Classification Search
CPC ......... G01S 19/37; G01S 19/485; G01S 19/14
USPC .................................................... 342/357.77
See application file for complete search history.

(56) References Cited

U.S. PATENT DOCUMENTS 12,591,066 B2 * 3/2026 Kim ...................... G01S 19/015

FOREIGN PATENT DOCUMENTS

| | | | | |
|---|---|---|---|---|
| CN | 108492563 B | * 11/2020 | .......... | G08G 1/0137 |
| EP | 1906343 A2 | * 4/2008 | .......... | G06F 18/214 |
| EP | 3712557 A1 | * 9/2020 | ............ | G01S 19/14 |

* cited by examiner

*Primary Examiner* — Harry K Liu
(74) *Attorney, Agent, or Firm* — PORUS IP LLC

(57) ABSTRACT

Embodiments of the present disclosure provide a drift optimization system for a vehicle-mounted machine based on a global positioning system (GPS). The system comprises a vehicular sensor, a camera unit, a GPS receiver, a memory, and a processor of a current vehicle. The processor is configured to set a datum point; determine a classification result of a GPS position by judging each GPS position in a GPS position sequence acquired from a GPS receiver during a preset time period; send a first command in response to the GPS position being a secure GPS position; and reset the datum point in response to the GPS position being an abnormal GPS position and first N1-1 GPS positions prior to the GPS position in the GPS position sequence being abnormal GPS positions.

20 Claims, 14 Drawing Sheets

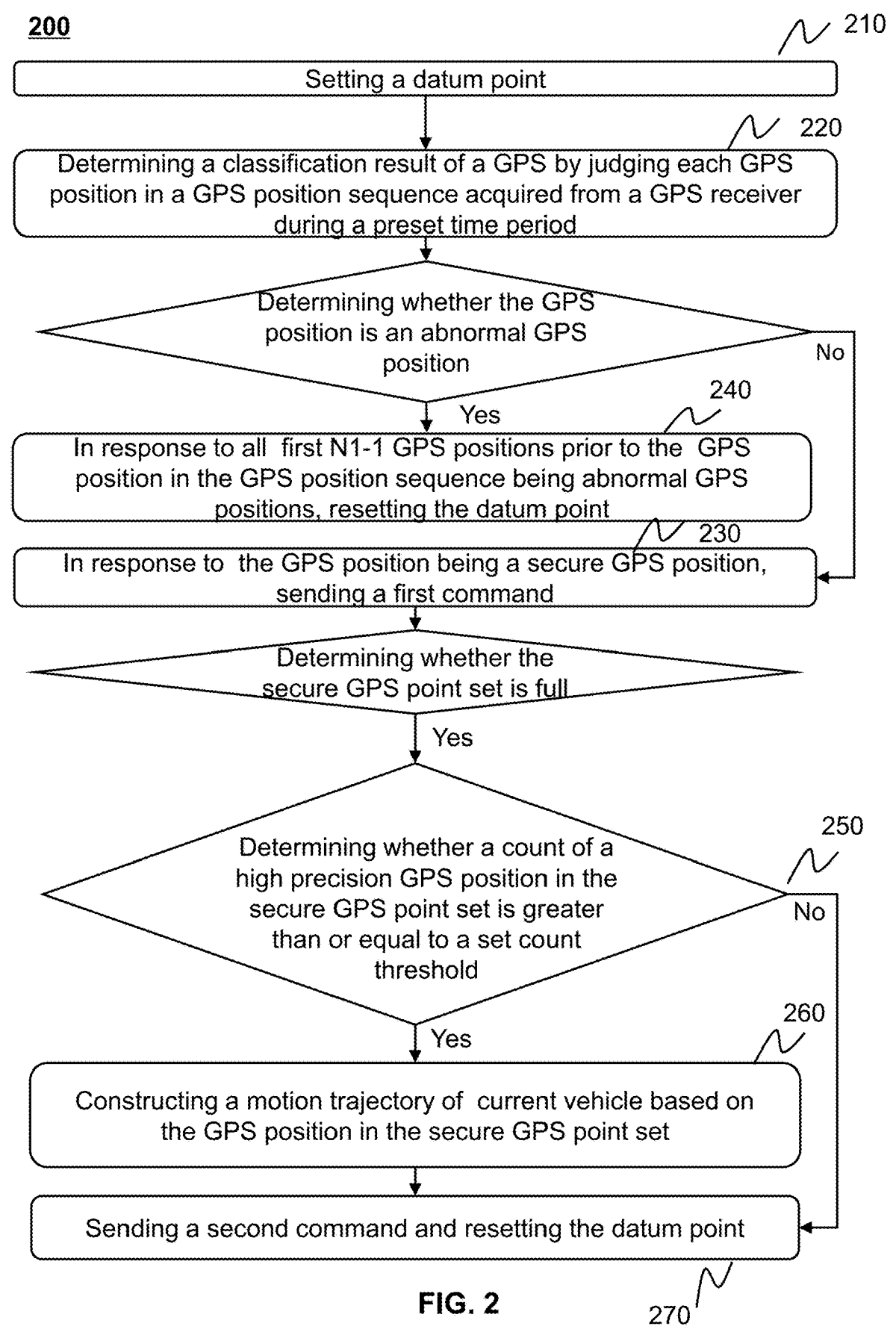

200

210 Setting a datum point

220 Determining a classification result of a GPS by judging each GPS position in a GPS position sequence acquired from a GPS receiver during a preset time period Determining whether the GPS position is an abnormal GPS position Yes No 240 In response to all first N1-1 GPS positions prior to the GPS position in the GPS position sequence being abnormal GPS positions, resetting the datum point 230 In response to the GPS position being a secure GPS position, sending a first command Determining whether the secure GPS point set is full Yes 250 Determining whether a count of a high precision GPS position in the secure GPS point set is greater than or equal to a set count threshold No Yes 260 Constructing a motion trajectory of current vehicle based on the GPS position in the secure GPS point set 270 Sending a second command and resetting the datum point

FIG. 2

DRIFT OPTIMIZATION SYSTEMS FOR VEHICLE-MOUNTED MACHINES BASED ON GLOBAL POSITIONING SYSTEMS

CROSS-REFERENCE TO RELATED APPLICATIONS

The present disclosure claims priority to Chinese patent application No. 202311157201.8, filed on Sep. 8, 2023, the entire contents of which are incorporated herein by reference.

TECHNICAL FIELD

The present disclosure relates to the technical field of GPS drift point optimization, and in particular, to a drift optimization system for a vehicle-mounted machine based on a global positioning system (GPS).

BACKGROUND

GPS drift point optimization technology is designed to solve the drift phenomenon of the deviation of a GPS position result. Due to the interference of a plurality of factors, the GPS position results may deviate from the actual position, which may adversely affect navigation, mapping, or the like. Therefore, GPS drift point optimization techniques may be used to solve the drift phenomenon of the GPS position result deviation. The current GPS drift point optimization technique is complex and has high computational resource requirements with slow calculational speed, and is not applicable to transportation vehicles such as buses, which require real-time positioning to match the stations.

Therefore, it is desired to provide a drift optimization system for a vehicle-mounted machine based on a global positioning system (GPS), which is capable of simplifying GPS drift point optimization techniques and overcoming the problem of poor real-time performance of GPS drift point optimization techniques.

SUMMARY

Some embodiments of the present disclosure provide a drift optimization system for a vehicle-mounted machine based on a global positioning system (GPS). The system may comprise a vehicular sensor, a camera unit, a GPS receiver, a memory, and a processor of a current vehicle. The vehicular sensor may be configured to acquire environmental parameters and vehicle parameters. The camera unit may be configured to acquire the environmental parameters and a count of vehicles in a preset range. The GPS receiver may be configured to receive a navigation signal sent by a navigation satellite. The memory may be configured to store a secure GPS point set and intermediate data generated during drift optimization. The processor may be in communication with the vehicular sensor, the GPS receiver, the camera unit, and the memory. The processor may be configured to set a datum point; determine a classification result of the GPS position by judging each GPS position in a GPS position sequence acquired from the GPS receiver during a preset time period, the classification result including at least one of a secure GPS position, a high precision GPS position, and an abnormal GPS position; in response to determining the GPS position is the secure GPS position, sending a first command, the first command instructing the memory to store the GPS position to the secure GPS point set; and in response to determining the GPS position is the abnormal GPS position and all first N1-1 GPS positions prior to the GPS position in the GPS position sequence are abnormal GPS positions, reset the datum point, and N1 is a set value; in response to detecting that the secure GPS point set in the memory is full, determining whether a count of the high precision GPS position in the secure GPS point set is greater than or equal to a set count threshold; in response to determining the count of the high precision GPS position in the secure GPS point set is greater than or equal to the set count threshold, construct a motion trajectory of the current vehicle based on the GPS position in the secure GPS point set; and in response to determining the count of the high precision GPS position in the secure GPS point set is less than the set count threshold, send a second command and reset the datum point, the second command being configured to instruct the memory to empty the secure GPS point set.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, where:

FIG. 2 is a flowchart illustrating an exemplary drift optimization process for a vehicle-mounted machine based on a global positioning system (GPS) according to some embodiments of the present disclosure;

DETAILED DESCRIPTION

Figure 1:
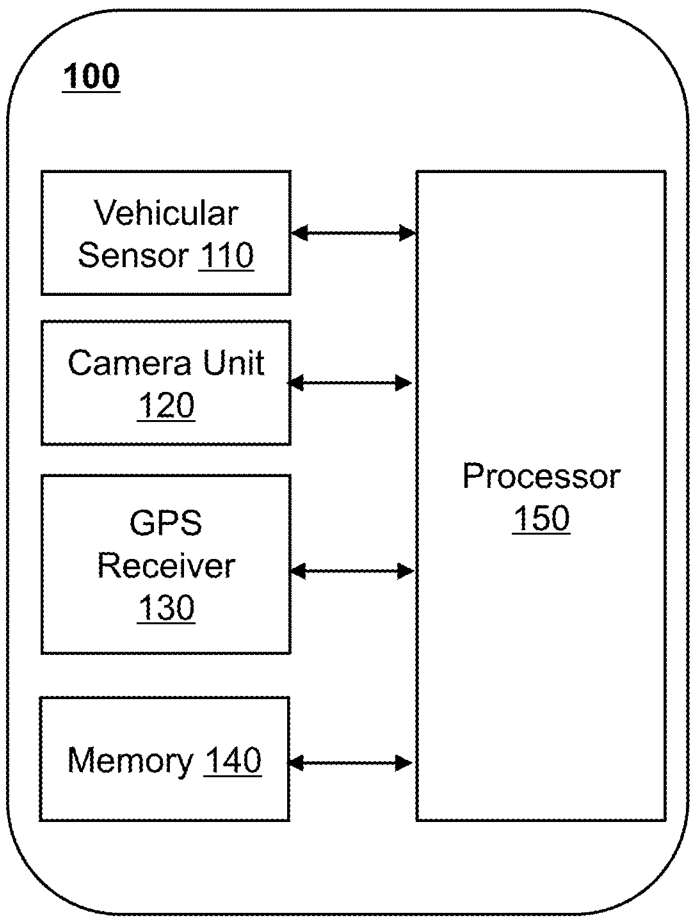
FIG. 1 is a schematic diagram illustrating exemplary modules of a drift optimization system for a vehicle-mounted machine based on a global positioning system (GPS) according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

FIG. 1 is a schematic diagram illustrating an exemplary drift optimization system for a vehicle-mounted machine based on a global positioning system (GPS) according to some embodiments of the present disclosure.

In some embodiments, a drift optimization system 100 for a vehicle-mounted machine based on a global positioning system (GPS) may include a vehicular sensor 110, a camera unit 120, a GPS receiver 130, a memory 140, and a processor 150 of a current vehicle. The processor 150 may be in communication with the vehicular sensor 110, the camera unit 120, the GPS receiver 130, and the memory 140. The vehicular sensor 110, the camera unit 120, the GPS receiver 130, the memory 140, and the processor 150 may be deployed on the current vehicle.

In some embodiments, the camera unit 120 may be configured to obtain environmental parameters and a count of vehicles in a preset range. For example, the camera unit 120 may include a panoramic camera, or the like.

The environmental parameters may be parameters related to an environment where the current vehicle is located.

In some embodiments, the environmental parameters may include a density of environmental obstacles along a road where the current vehicle is located, a change in height of trees, and whether the current vehicle is in a signal-blocking zone. The density of the environmental obstacles may include a density of trees, high buildings, or the like. The signal-blocking zone refers to signal-blocking zones of the camera unit, the GPS receiver, or the like.

The preset range may be a region within a preset radius with the current vehicle as a center. The preset radius may be preset by a person skilled in the art based on experience.

In some embodiments, the vehicular sensor 110 may be configured to obtain the environmental parameters and vehicle parameters. For example, the vehicular sensor 110 may include a fuel sensor, a speed sensor, an inertial measurement unit, or the like.

In some embodiments, the environmental parameters may also include a roadway slope, and the vehicular sensor 110 may further include an incline sensor. The incline sensor may be configured to obtain the roadway slope.

The roadway slope may be a ratio of a vertical height of a slope on which the current vehicle is traveling to a distance along a horizontal direction.

In some embodiments of the present disclosure, the environmental parameters may also take into account the roadway slope, which can further overcome the defect of poor real-time performance of the GPS drift point optimization technique.

In some embodiments, the vehicle parameters may include a fuel consumption situation of a vehicle, a speed and an acceleration of the vehicle, etc., at a plurality of historical moments within a preset historical time period. The preset historical time period may be a historical time period from a current moment. The preset historical time period may be preset by a person skilled in the art as desired.

In some embodiments, the fuel sensor and the speed sensor may sequentially obtain the fuel consumption situation of the vehicle and the speed of the vehicle at the plurality of historical moments within the preset historical time period. The inertial measurement unit may obtain a lateral speed and the acceleration of the vehicle at the plurality of historical moments within the preset historical time period.

In some embodiments, the GPS receiver 130 may be configured to receive a navigation signal sent by a navigation satellite.

In some embodiments, the memory 140 may be configured to store a secure GPS point set and intermediate data generated during drift optimization.

The secure GPS point set may be a collection consisting of a plurality of secure GPS positions. More content about the secure GPS position can be found in operation 220 and the related descriptions thereof.

In some embodiments, the intermediate data generated during the drift optimization may include a classification result of the GPS position, a GPS position sequence, and a motion trajectory of a vehicle, etc.

More content about the classification result and the GPS position sequence can be found in operation 220 and the related descriptions thereof.

The motion trajectory of a vehicle is a traveling trajectory of the current vehicle.

In some embodiments, the processor 150 may be configured to perform a drift optimization method for a vehicle-mounted machine based on a global positioning system (GPS) shown in FIG. 2. More descriptions can be found in FIG. 2 and the related description thereof.

FIG. 2 is a flowchart illustrating an exemplary drift optimization method for a vehicle-mounted machine based on a global positioning system (GPS) according to some embodiments of the present disclosure. In some embodiments, a process 200 may be executed by the processor 150 of the drift optimization system 100 for a vehicle-mounted machine based on a global positioning system (GPS). In some embodiments, the process 200 may include operation 210 to operation 270 as follows.

In 210, setting a datum point.

The datum point may be a fixed reference point. The datum point may be used to determine all other measurement points.

In some embodiments, the processor may use any feasible manner to set the datum point.

In some embodiments, the processor may also determine the datum point using a manner described in operation 510 to operation 550 below. More descriptions can be found in the content below.

In 220, determining a classification result of a GPS position by judging each GPS position in a GPS position sequence sent by a GPS receiver during a preset time period.

The preset time period may be a pre-set period of time. The preset time period may be preset for a person skilled in the art based on experience.

The GPS position sequence is a sequence consisting of a plurality of GPS positions acquired during the preset time period.

In some embodiments, the processor may calculate and obtain the GPS position sequence based on navigation information sent by the navigation satellite obtained from the GPS receiver during the preset time period using a preset approach. The preset approach may include a plane triangulation approach, a least squares approach, or the like.

In some embodiments, the processor may, for every time navigation information is received, calculate a GPS position based on the navigation information using the preset approach, and then obtain the GPS position sequence through a plurality of calculations.

In some embodiments, the classification result may include at least one of a secure GPS position, a high precision GPS position, and an abnormal GPS position. In some embodiments, the secure GPS position may include the high precision GPS position. For example, the classification result of the GPS position may include the secure GPS position and the abnormal GPS position, and the secure GPS position may be the high precision GPS position when a portion of the GPS position in the secure GPS position satisfies a corresponding condition. The corresponding condition may be preset for a person skilled in the art based on experience.

In some embodiments, a horizontal accuracy factor of the secure GPS position is less than k1 and a count of associated satellites of the secure GPS position is greater than n1, and a horizontal accuracy factor of the high precision GPS position is less than k2 and a count of associated satellites of the high precision GPS position is greater than n2, and $0<k2<k1$ and $0<n1<n2$.

The horizontal accuracy factor may be used to evaluate a positioning accuracy of the GPS position along a horizontal direction.

The count of associated satellites may be a count of navigation satellites used during GPS positioning.

Only by way of example, $0<k2<k1\leq 7$ and $0<n1<n2<24$. k1, k2, n1, and n2 may be preset for those skilled in the art based on experience. For example, k1=3, k2=2, n1=4, and n2=5. As another example, k1=7, k2=3.5, n1=1, n2=12. As another example, k1=3.5, k2=1, n1=12, n2=23. k1, k2, n1, and n2 may be preset for those skilled in the art based on experience. For example, k1=3, k2=2, n1=4, and n2=5. As another example, k1=7, k2=3.5, n1=1, n2=12. As another example, k1=3.5, k2=1, n1=12, n2=23.

In some embodiments, the abnormal GPS position satisfies that one of a longitude value or a latitude value is 0 or that the count of associated satellites is greater than 24.

In some embodiments of the present disclosure, a manner of defining the secure GPS position and the high precision GPS position by combining the horizontal accuracy factor and the count of associated satellites is simple and effective and achieves an efficient GPS position screening.

In some embodiments, the processor may judge the each GPS position in the GPS position sequence sent by the GPS receiver during the preset time period. For example, in response to determining that the horizontal accuracy factor of the GPS position is less than k1 (e.g., 3) and the count of associated satellites of the GPS position is greater than n1 (e.g., 4), the processor may determine that the GPS position is the secure GPS position. As another example, in response to determining the horizontal accuracy factor of the GPS position is less than k2 (e.g., 2) and the count of associated satellites of the GPS position is greater than n2 (e.g., 5), then the GPS position may be the high precision GPS position; and in response to determining one of the longitude value or the latitude value of the GPS position is 0 or the count of associated satellites of the GPS position is greater than 24, the processor may determine that the GPS position is the abnormal GPS position.

In some embodiments, for each GPS position obtained from the GPS receiver during the preset time period, the processor may also determine the classification result of the GPS position based on the horizontal accuracy factor, the count of associated satellites, the vertical accuracy factor, and the environmental parameters of the GPS position.

The vertical accuracy factor may be used to evaluate a positioning accuracy of the GPS position along a vertical direction.

In some embodiments, the horizontal accuracy factor, the count of associated satellites, and the vertical accuracy factor of the GPS position may be automatically calculated and obtained by a GPS receiver, and the processor may obtain the horizontal accuracy factor, the count of associated satellites, and the vertical accuracy factor of the GPS position through the GPS receiver.

In some embodiments, the processor may also obtain the environmental parameters via the vehicular sensor or the camera unit.

In some embodiments, for each GPS position obtained from the GPS receiver during the preset time period, the processor may determine a first target feature vector based on the horizontal accuracy factor, the count of associated satellites, the vertical accuracy factor, and the environmental parameters of the GPS position; and determine a first associated feature vector based on the first target feature vector via a first vector database; and determine a classification result of a reference GPS position corresponding to the first associated feature as the classification result of the GPS position.

The first vector database may include a plurality of first reference feature vectors, and each first reference feature vector has a classification result of a corresponding reference GPS position. In some embodiments, the processor may determine a classification result of a GPS position with a highest accuracy in the secure GPS point set corresponding to the first reference feature vector in historical data as the classification result of the reference GPS position.

Only by way of example, the secure GPS point set corresponding to the first reference feature vector in the historical data may be a historical GPS point set satisfying a specific condition. The historical GPS point set satisfying a specific condition may be a historical secure GPS point that has the highest percentage of the high precision GPS position or has the highest percentage of the valid point after screening among a plurality of historical secure GPS point sets corresponding to the first reference feature vector. Having the highest percentage of the high precision GPS position refers to that among all the plurality of historical secure GPS point sets corresponding to the first reference feature vector, there is a particular historical secure GPS point set that has the highest count of the high precision GPS position compared to other historical secure GPS point sets. Having the highest percentage of the valid point refers to that among all the plurality of historical secure GPS point sets corresponding to the first reference feature vector, there is a particular historical secure GPS point set that has the highest count of the valid point compared to other historical secure GPS point sets. More content about the valid point can be found in operation 315 in FIG. 3 and the related descriptions thereof.

The first reference feature vector may be a feature vector constructed based on a horizontal accuracy factor, a count of associated satellites, a vertical accuracy factor, and environmental parameters of the historical GPS position.

According to some embodiments of the present disclosure, the processor may, based on the first target feature vector, determine a first reference feature vector that satisfies a first target preset condition in the first vector database, and determine the first reference feature vector that satisfies the first target preset condition as a first associated feature vector. In some embodiments, the first target preset condition may include a vector distance from the first target feature vector being minimal, or the like.

In some embodiments, the processor may determine a classification result of a reference GPS position corresponding to the first associated feature vector as the classification result of the GPS position.

In some embodiments, the processor may perform operation 230 or operation 240, correspondingly, based on the classification result of the GPS position.

In 230, in response to determining the GPS position is the secure GPS position, sending a first command.

The first command may instruct the memory to store the GPS position to the secure GPS point set.

In 240, in response to determining the GPS position is the abnormal GPS position and all first N1-1 GPS positions prior to the GPS position in the GPS position sequence are abnormal GPS positions, resetting the datum point.

In some embodiments, N1 may be a preset value. N1 may be preset by those skilled in the art based on experience.

Figure 3:
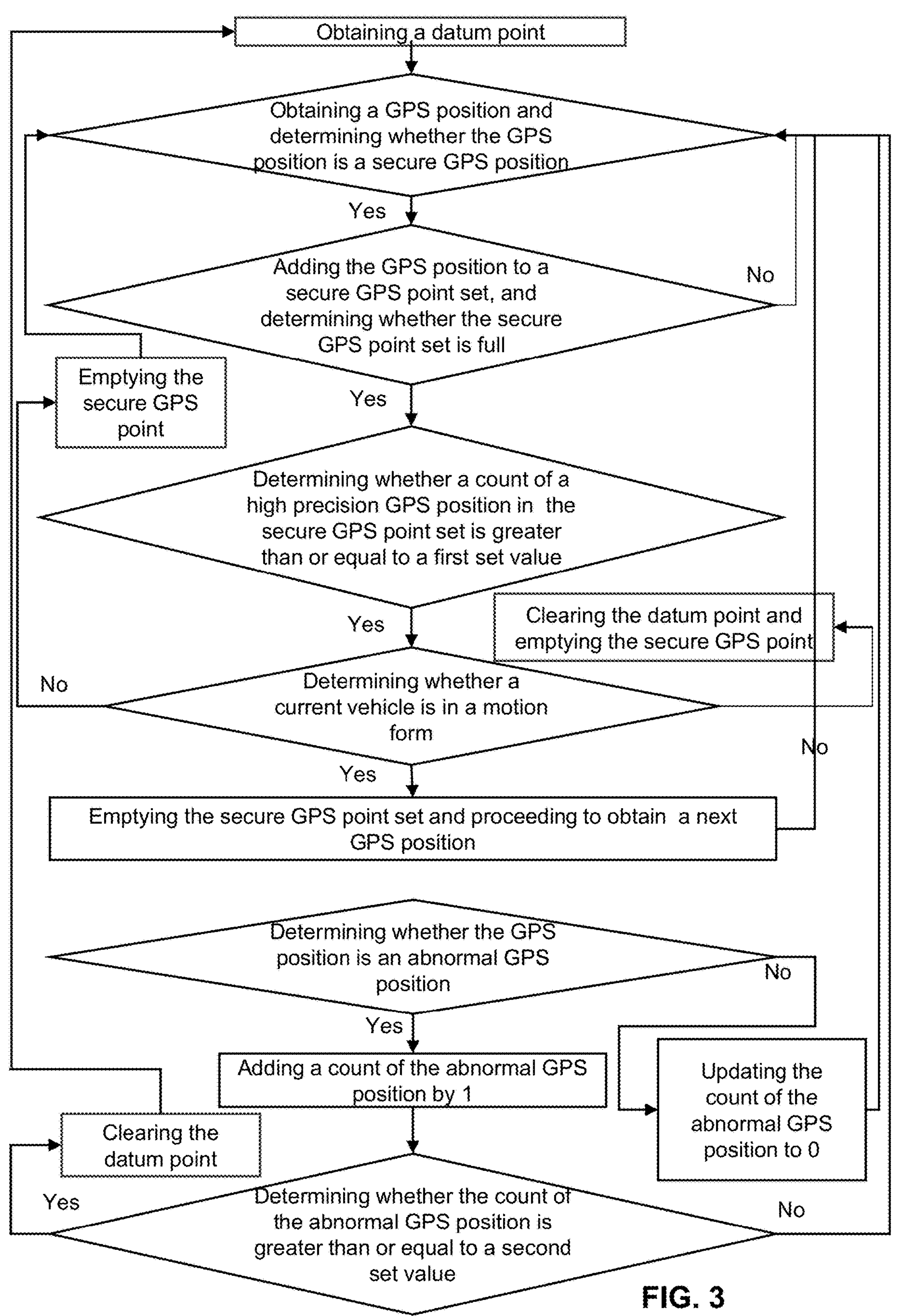
FIG. 3 is a flowchart illustrating another exemplary drift optimization process for a vehicle-mounted machine based on a global positioning system (GPS) according to some embodiments of the present disclosure.

More content about how to reset the datum point can be found in FIG. 3 and the related descriptions thereof.

In some embodiments, the processor may also perform the operation 220 after resetting the datum point.

In 250, in response to detecting that the secure GPS point set in the memory is full, determining whether a count of the high precision GPS position in the secure GPS point set is greater than or equal to a set count threshold.

The secure GPS point set being full refers to that a count of the secure GPS position stored in the secure GPS point set has reached a capacity of the secure GPS point set.

The capacity of the secure GPS point set may be a maximum count of the secure GPS position that may be stored in the secure GPS point set. For example, the capacity of the secure GPS point set may be 10.

According to some embodiments of the present disclosure, the processor may determine the capacity of the secure GPS point set based on the vehicle parameters, a roadway condition, a distance between adjacent GPS positions in the GPS position sequence, and the environmental parameters.

According to some embodiments of the present disclosure, the roadway condition may include traffic congestion, a road curvature, or the like of a current roadway where a current vehicle is located.

The traffic congestion may reflect a smoothness of the current roadway where the current vehicle is traveling.

According to some embodiments of the present disclosure, the processor may determine the traffic congestion based on a count of vehicles within a preset range and a speed of the vehicles. For example, if the count of vehicles within the preset range is greater than a vehicle threshold (i.e., 5, etc.) and a frequency of the speed of the vehicles reaching zero is greater than a preset frequency threshold, the processor may determine that the current roadway is in a traffic congestion. The vehicle threshold and the preset frequency threshold may be preset empirically for a person skilled in the art.

The frequency of the speed of the vehicles reaching zero may be a count of times the vehicle's speed becomes zero during a preset historical time period. The preset historical time period may be preset empirically for those skilled in the art.

As another example, the greater the count of vehicles within the preset range, and the more frequently the speed of the vehicles reaching zero exceeds the preset frequency threshold, the processor may determine that the current roadway is more congested.

The road curvature may be a radius curvature of the roadway where the current vehicle is located.

According to some embodiments of the present disclosure, the processor may calculate the road curvature based on the lateral velocity and acceleration of the vehicle obtained by the inertial measurement unit.

As an example only, the processor may calculate the road curvature Z, using following two equations:

$R=a/v^2$, where $R$ denotes the curvature, $a$ denotes transverse acceleration, and $v$ denotes transverse velocity;

$$Z=1/R.$$

The distance between adjacent GPS positions may be a straight-line distance between any two adjacent GPS positions in the GPS position sequence.

In some embodiments, the processor may determine, based on latitude and longitude information of any two adjacent GPS positions, a straight-line distance between the two adjacent GPS positions using a preset algorithm (e.g., the cosine theorem, etc.).

In some embodiments, the processor may determine a sequential density of the GPS position based on the distance between any two adjacent GPS positions in the GPS position sequence and a count of the GPS position in the GPS position sequence; and determine a capacity of the secure GPS point set based on the vehicle parameters, the roadway conditions, the sequential density of the GPS position, and the environmental parameters.

The sequential density of the GPS position may be a density of GPS positions in the GPS position sequence.

In some embodiments, the processor may use a ratio of the count of the GPS position in the GPS position sequence to a sum of specific distances as the sequential density of the GPS position. The sum of specific distances may be a sum of distances between any two adjacent GPS positions in the GPS position sequence.

In some embodiments, the processor may, based on the vehicle parameters, the roadway condition, and the sequential density of the GPS position, determine a second target feature vector, and each second target feature vector corresponding to an environmental parameter; based on the second target feature vector and through a second vector database, determine an average value of capacities of a plurality of reference secure GPS point sets corresponding to a plurality of second associated feature vectors as the capacity of the secure GPS point set.

The second vector database may include a plurality of second reference feature vectors, and each second reference feature vector corresponds to a corresponding capacity of a reference secure GPS point set and a reference environmental parameter.

In some embodiments, the processor may determine a historical environmental parameter corresponding to each of the plurality of second reference feature vectors as the reference environmental parameter.

In some embodiments, the processor may determine a capacity of a historical secure GPS point set with a best subsequent correction effect during drift optimization corresponding to feature vectors in historical data as the capacity of the reference secure GPS point set.

Only as an example, the best subsequent correction effect refers to that a subsequently-constructed motion trajectory of a vehicle is the smoothest or that the subsequently-constructed motion trajectory of a vehicle mostly fits to a road. The motion trajectory of a vehicle being the smoothest refers to that there is no abnormal bump or an abnormal bump that is lower than a preset bump threshold on a curve of the motion trajectory of a vehicle. The preset bump threshold may be preset by a person skilled in the art based on experience. The abnormal bump may be a curve on the curve of the motion trajectory of a vehicle that protrudes from a curved portion of the roadway.

The second reference feature vector may be a feature vector constructed based on historical vehicle parameters, a historical roadway condition, and a sequential density of a historical GPS position.

In some embodiments, the processor may classify second feature vectors in the second vector database based on reference environmental parameters corresponding to the second feature vector, and classify the second feature vectors into two categories including "in a signal-blocking region" and "not in a signal-blocking region";

determine a category to which the second target feature vector belongs based on environmental parameters corresponding to the second target feature vector;

select, among the category to which the second target feature vector belongs, a plurality of the second associated feature vectors whose similarity with the second target vector satisfies a second target preset condition (e.g., the similarity is greater than a first preset similarity threshold) and determine an average value of capacities of reference secure GPS point sets corresponding to the plurality of the second associated feature vectors as the capacity of the secure GPS point set. The first preset similarity threshold may be set empirically for a person skilled in the art.

In some embodiments, the processor may also determine the capacity of the secure GPS point set based on the vehicle parameters, the roadway condition, the distance between adjacent GPS positions in the GPS position sequence, and the environmental parameters using a capacity prediction model.

In some embodiments, the capacity prediction model may be a machine learning model. In some embodiments, the capacity prediction model may be a neural network (NN) model or a deep neural network (DNN) model, or the like.

In some embodiments, inputs to the capacity prediction model may include the vehicle parameters, the roadway condition, the distance between adjacent GPS positions in the GPS position sequence, and the environmental parameters, and an output of the capacity prediction model may include the capacity of the secure GPS point set.

In some embodiments, the input to the capacity prediction model may also include a fluctuation degree of the GPS position sequence.

The fluctuation degree of the GPS position sequence refers to a difference between an upper limit and a lower limit of the horizontal accuracy factor of a plurality of GPS positions in the GPS position sequence and/or a difference between an upper limit and a lower limit of the vertical accuracy factor of the plurality of GPS positions in the GPS position sequence.

In some embodiments, the processor may obtain a horizontal accuracy factor and/or a vertical accuracy factor of the plurality of the GPS positions in the GPS position sequence, calculate the difference between the upper limit and the lower limit of the horizontal accuracy factor of the plurality of the GPS positions in the GPS position sequence and/or the difference between the upper limit and the lower limit of the vertical accuracy factor of the GPS positions in the GPS position sequence. More descriptions of the horizontal accuracy factor and the vertical accuracy factor can be found in the relevant description in the operation 220.

In some embodiments of the present disclosure, the stability of the GPS position affects a spatial and temporal continuity of the motion trajectory of a vehicle. Therefore, considering the fluctuation degree of a currently-acquired GPS position sequence when determining the capacity of the secure GPS point set can ensure the coherence and accuracy of a motion trajectory of a vehicle subsequently constructed based on the secure GPS point set.

In some embodiments, the capacity prediction model may be obtained by training a plurality of first training samples with a first label.

In some embodiments, each set of first training samples in the first training sample may include historical sample vehicle parameters, a historical sample roadway condition, a distance between adjacent GPS positions in a historical sample GPS position sequence, and historical sample environmental parameters. The first training label may be a capacity of a secure GPS point set corresponding to the first training sample.

In some embodiments, the first training sample may be obtained from historical data.

In some embodiments, the processor may determine the second target feature vector based on the historical sample vehicle parameters, the historical sample roadway condition, a sequential density of the historical sample GPS position sequence, and the historical sample environmental parameters. In some embodiments, the processor may determine, based on the second target feature vector and through the second vector database, an average value of capacities of reference secure GPS point sets corresponding to a plurality of second associated feature vector, as the capacity of the secure GPS point set corresponding to the first training sample. For more description of this section, please refer to the preceding description.

In some embodiments, the processor may input the historical sample vehicle parameters, the historical sample roadway condition, the distance between adjacent GPS positions in the historical sample GPS position sequence, and the historical sample environmental parameters into an initial capacity prediction model, then a loss function may be constructed based on the first label and a prediction result of the initial capacity prediction model, parameters of the initial capacity prediction model may be iteratively updated based on the loss function until the loss function converges, a count of iterations reaches a threshold, or the like, and a trained capacity prediction model may be obtained when a training completes.

In some embodiments, the first training sample may further include a fluctuation degree of the historical sample GPS position sequence.

Understandably, during a training process of the capacity prediction model, a learning rate of the initial capacity prediction model may be different when the initial capacity prediction model is trained based on different first training samples.

In some embodiments, a learning rate of the first training sample may be related to a count of GPS positions in a historical sample GPS position sequence in the first training sample.

Specifically, the larger the count of the GPS positions in the historical sample GPS position sequence in the first training sample, the larger the corresponding learning rate of the first training sample.

In some embodiments of the present disclosure, since the larger the learning rate of the capacity prediction model, the larger the magnitude of the parameter update of the capacity prediction model, when a data size of a plurality of the first training samples is large, appropriately increasing the learning rate of the first training sample can accelerate the speed of convergence of the capacity prediction model and improve the training efficiency.

The set count threshold may be a threshold value of a count of the high precision GPS position.

In some embodiments, the set count threshold may be preset for a person skilled in the art based on experience.

Figure 4:
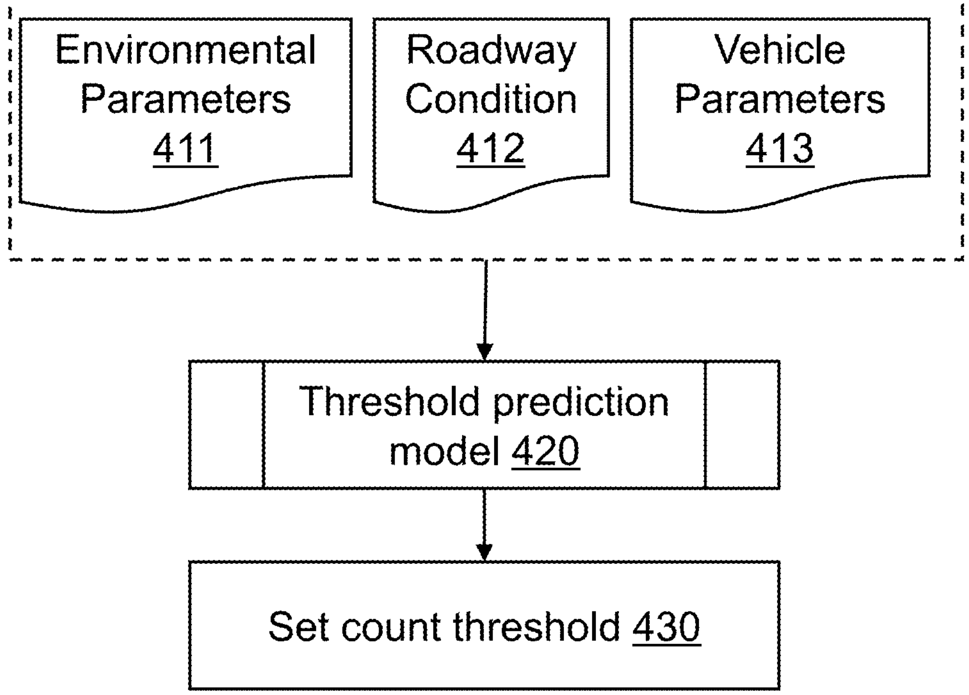
FIG. 4 is a flowchart illustrating an exemplary process for determining a set count threshold according to some embodiments of the present disclosure.

In some embodiments, the processor may also determine the set count threshold using a manner shown in FIG. 4, as described in FIG. 4.

In some embodiments, the processor may perform operation 260 or operation 270, correspondingly, based on a judgment result of whether a count of the high precision GPS position in the secure GPS point set is greater than or equal to the set count threshold.

In 260, in response to determining the count of the high precision GPS position in the secure GPS point set is greater than or equal to the set count threshold, constructing a motion trajectory of the current vehicle based on the GPS position in the secure GPS point set.

In some embodiments, the processor may, in response to determining the count of the high precision GPS position in the secure GPS point set being greater than or equal to the set count threshold, sequentially connect the GPS positions in the secure GPS point set to obtain a smooth curve and determine the smooth curve as the motion trajectory of the current vehicle.

In 270, in response to determining the count of the high precision GPS position in the secure GPS point set is less than the set count threshold, sending a second command and resetting the datum point.

In some embodiments, the second command may be used to instruct the memory to empty the secure GPS point set.

In some embodiments, the processor may also re-perform operation 220 after resetting the datum point.

In some embodiments, the processor may also employ another drift optimization method for a vehicle-mounted machine based on a global positioning system (GPS) as shown in FIG. 3 and perform operation 230 to operation 270 as described above, as described in FIG. 3.

In some embodiments, the processor may be further configured to, for every preset period, based on a GPS reception frequency, the roadway condition, and the environmental parameters, generate a fourth command and send the fourth command to the camera unit.

In some embodiments, the preset period may be related to a set value of a capacity of a current secure GPS point set. For example, the larger the set value of the capacity of the current secure GPS point set, the longer the value of the preset period may be preset. For more content about the capacity of the secure GPS point set, please refer to the preceding description.

In some embodiments of the present disclosure, by correlating the preset period to the set value of the capacity of the current secure GPS point set, the longer the capacity of the current secure GPS point set and the greater the fault tolerance, the longer the preset period may be set, thereby reducing a frequency of drift optimization based on the environmental parameters collected at a preset monitoring frequency, which also achieves a higher accuracy of drift optimization and thus saves calculation resources.

In some embodiments, the fourth command may adjust the camera unit to acquire the environmental parameters at a preset monitoring frequency. In some embodiments, the fourth command may include the preset monitoring frequency.

The preset monitoring frequency may be a preset count of times to monitor per unit of time.

In some embodiments, the processor may determine the preset monitoring frequency based on an initial monitoring frequency and an adjustment amount of monitoring frequency during a current cycle.

The initial monitoring frequency may be a monitoring frequency of an initial state. In some embodiments, the processor may determine the GPS reception frequency as the initial monitoring frequency.

The GPS reception frequency may be a frequency at which the GPS receiver receives a navigation signal. The GPS reception frequency may be a fixed value and may be determined based on a frequency at which a satellite sends a signal.

The adjustment amount of the monitoring frequency may be an amount of increase or decrease in the initial monitoring frequency.

In some embodiments, the adjustment amount of the monitoring frequency may include an enhancement amount of monitoring frequency or a decline amount of monitoring frequency. The enhancement amount of monitoring frequency may be an increase amount in the initial monitoring frequency. The decline amount of monitoring frequency may be a decrease amount in the initial monitoring frequency.

In some embodiments, the processor may determine the adjustment amount of the monitoring frequency of the current cycle based on a road curvature and a density of environmental obstacles acquired by the camera unit in a previous cycle. For more content about the road curvature and the density of the environmental obstacles, please refer to the preceding description.

For example, the processor may, in response to determining the greater the absolute value of the road curvature acquired by the camera unit in the previous cycle, and in response to determining the greater the density of the environmental obstacles along a roadway where a previous vehicle is located exceeding a standard density degree, determine a corresponding enhancement amount of monitoring frequency to be larger. The standard density degree may be preset for a person skilled in the art based on experience.

As another example, the processor may, in response to determining the smaller the absolute value of the road curvature acquired by the camera unit in the previous cycle, and in response to determining the density of the environmental obstacles along the roadway where the previous vehicle is located is less than the standard density degree, determine a corresponding decline amount of monitoring frequency to be larger.

Understandably, the closer the absolute value of the road curvature and a difference between the density of the environmental obstacles along the roadway where the current vehicle is located and the standard density degree tends to be zero, the smaller the adjustment amount of the monitoring frequency.

In some embodiments, the processor may use a value obtained by adding the initial monitoring frequency to the enhancement amount of monitoring frequency increase as the preset monitoring frequency, or a value obtained by subtracting the decline amount of monitoring frequency from the initial monitoring frequency as the preset monitoring frequency.

In some embodiments of the present disclosure, adjusting the preset monitoring frequency of the camera unit based on the density of the environmental obstacles and the road curvature acquired by the camera unit in the previous cycle can minimize a frequency of updating the preset monitoring frequency of the environmental parameters while ensuring the accuracy of the environmental parameters, thereby saving resources and improving the efficiency of drift optimization.

In some embodiments of the present disclosure, the processor of the system realizes progressive screening of the GPS position by defining the secure GPS position and the high precision GPS position; by combining the abnormal GPS position to update the datum point, it realizes the screening of the GPS position and the elimination of drift points based on simple logic and judgment, thereby greatly improving the efficiency of GPS drift optimization and improving the real-time nature of trajectory mapping.

The processor of the system updates the datum point by combining continuous abnormal GPS positions, eliminates an occasional abnormal positioning, avoids a vicious cycle of the GPS position judgment, and ensures the normal execution of the GPS position judgment.

The processor of the system screens a valid point for the secure GPS position by combining the datum point, which is equivalent to realizing the GPS position correction every other journey, so as to ensure the accuracy of the GPS position throughout the journey.

FIG. 3 is another exemplary flowchart illustrating a drift optimization method for a vehicle-mounted machine according to a global positioning system (GPS) according to some embodiments of the present disclosure. In some embodiments, a process 300 may be executed by a processor of the drift optimization system 100 for a vehicle-mounted machine based on a global positioning system (GPS).

In some embodiments, the processor may determine whether a datum point currently exists, and in response to determining the datum point currently exists, the processor may perform operation 310 to operation 3130 as follows; and in response to determining the datum point doesn't exist currently, the processor may perform operation 510 to operation 550 as follows.

In 310, obtaining the datum point and a GPS position, and determining whether the GPS position is a secure GPS position.

More content about the datum point and the secure GPS position can be found in FIG. 2 and the related descriptions thereof.

In some embodiments, the processor may acquire an existing datum point and acquire the GPS position via a GPS receiver.

More content about how to determine whether the GPS position is the secure GPS position can be found in operation 220 in FIG. 2 and the related descriptions thereof.

In some embodiments, the processor may perform operation 311, operation 318, or operation 319 correspondingly based on a judgment result of whether the GPS position is the secure GPS position. Operation 311 and operation 318 may be performed simultaneously.

In 311, in response to determining the GPS position is the secure GPS position, adding the GPS position to a secure GPS point set, and determining whether the secure GPS point set is full.

More content about the secure GPS point set can be found in FIG. 1 and the related descriptions thereof.

In some embodiments, the processor may, in response to determining the GPS position is the secure GPS position, add the GPS position to the secure GPS point set, and then compare a total count of the GPS position in the secure GPS point set to a capacity of the secure GPS point set. If the total count of the GPS position in the secure GPS point set is equal to the capacity of the secure GPS point set, then the secure GPS point set may be judged to be full; otherwise, the secure GPS point set may be judged not to be full. The processor may perform operation 312 or operation 313 correspondingly based on a judgment result of whether the secure GPS point set is full.

More content about the capacity of the secure GPS point set can be found in operation 250 in FIG. 2 and the related descriptions thereof.

In 312, in response to determining the secure GPS point set is full, proceeding to obtain a next GPS position.

The next GPS position may be an adjacent GPS position in a GPS sequence that is behind a current GPS position.

In some embodiments, the processor may also reperform operation 310 after obtaining the next GPS position.

In 313, in response to determining the secure GPS point set is full, determining whether a count of a high precision GPS position in the secure GPS point set is greater than or equal to a first set value.

The first set value may be a threshold value for the count of the high precision GPS position in the secure GPS point set. The first set value may be preset by a person skilled in the art based on experience, e.g., the first set value may be 6.

In some embodiments, the processor may obtain a horizontal accuracy factor and a count of associated satellites of each secure GPS position in the secure GPS point set; and calculate a count of a secure GPS position in the secure GPS point set whose horizontal accuracy factor is less than k2 and a count of associated satellites is greater than n2, and determine the count of the secure GPS position as the count of the high precision GPS position. More content about the horizontal accuracy factor, the count of associated satellites, k2, and n2, can be found in operation 220 in FIG. 2 and the related descriptions thereof.

In some embodiments, the processor may perform operation 314 or operation 315 correspondingly, based on a judgment result of whether the count of the high precision GPS position in the secure GPS point set is greater than or equal to the first set value.

In 314, in response to determining the count of the high precision GPS position in the secure GPS point set is less than the first set value, clearing the datum point, emptying the secure GPS point set, and then re-acquiring the datum point.

In some embodiments, for a manner of re-acquiring the datum point, please refer to operation 510 to operation 550 below.

In some embodiments, the processor may also re-perform operation 310 after reacquiring the datum point.

In 315, in response to determining the count of the high precision GPS position in the secure GPS point set is greater than or equal to the first set value, determining whether a current vehicle is in a motion form.

In some embodiments, the processor may, in response to determining the count of the high precision GPS position in the secure GPS point set is greater than or equal to the first set value, determine whether the current vehicle is in the motion form based on vehicle parameters (e.g., speed of a vehicle, etc.) acquired by a vehicular sensor.

In some embodiments, the processor may also count GPS positions in the secure GPS point set whose distances from the datum point are within a distance threshold as valid points; and determine whether the current vehicle satisfies a constraint condition, and in response to determining the current vehicle satisfies the constraint condition, then determine that the current vehicle is in the motion form.

In some embodiments, the processor may calculate, by a preset manner (e.g., the cosine theorem, etc.), a straight-line distance between the datum point and each of the secure GPS positions in the secure GPS point set.

The distance threshold may be preset by a person skilled in the art based on experience, e.g., 5 meters.

The valid point may be a GPS position in the secure GPS point set whose distance from the datum point is within the distance threshold.

In some embodiments, the processor may also determine whether the GPS position is the valid point based on a fluctuation degree of the GPS position, a preset fluctuation threshold, and environmental parameters.

In some embodiments, the fluctuation degree of the GPS position may include a horizontal fluctuation degree and a vertical fluctuation degree.

The horizontal fluctuation degree may be a range of fluctuations of the horizontal accuracy factor of the GPS position. In some embodiments, the processor may determine a difference between an upper limit and a lower limit of a horizontal accuracy factor of a GPS position sequence to which the GPS position belongs as the range of fluctuations of the horizontal accuracy factor.

The vertical fluctuation degree may be a range of fluctuations of the vertical accuracy factor of the GPS position. In some embodiments, the processor may determine a difference between an upper limit and a lower limit of a vertical accuracy factor of the GPS position sequence to which the GPS position belongs as the range of fluctuations of the vertical accuracy factor.

The preset fluctuation threshold may include a horizontal fluctuation threshold and a vertical fluctuation threshold.

The horizontal fluctuation threshold may be a threshold value for the range of fluctuations of the horizontal accuracy factor of the GPS position.

The vertical fluctuation threshold may be a threshold value for the range of fluctuations of the vertical accuracy factor of the GPS position.

The preset fluctuation threshold may be preset by a person skilled in the art based on experience.

In some embodiments, the processor may determine the horizontal fluctuation threshold and the vertical fluctuation threshold based on the environmental parameters.

In some embodiments, the processor may determine the horizontal fluctuation threshold and the vertical fluctuation threshold based on the environmental parameters using a first preset control table. There are correspondences between reference environmental parameters and a reference horizontal fluctuation threshold and a reference vertical fluctuation threshold in the first preset control table. The first preset control table may be constructed based on a priori knowledge or historical data. For example, the horizontal fluctuation threshold may be preset to a larger value when a density of environmental obstacles along a road is greater and a height of trees changes more frequently; when the density of the environmental obstacles along the road is greater, the height of trees changes more frequently, and a roadway slope is greater, the vertical fluctuation threshold may be preset to a larger value.

In some embodiments of the present disclosure, when determining the valid point, removing a GPS position that is less stable or in a signal-blocking region can improve the accuracy of subsequent determination of whether a vehicle is in the motion form based on the valid point.

Additionally, the environmental obstacles along the road may block transmission of a satellite signal, resulting in attenuation or reflection of the signal, thus affecting the accuracy and precision of the GPS position. When the density of the environmental obstacles along the road becomes larger and the height of the trees changes more frequently, increasing the horizontal fluctuation threshold may ensure a count of the valid point without affecting the quality of the valid point. When the vehicle is in an uphill state or a downhill state, a change in height of the vehicle may introduce an additional error when calculating a position of the vehicle, which leads to the range of fluctuations of the vertical accuracy factor becoming larger. Therefore, at this time, increasing the vertical fluctuation threshold may ensure the count of the valid point, thus avoiding a situation where the count of the valid point is too small, resulting in a constructed motion trajectory of the vehicle being inaccurate.

The constraint condition may be used to determine whether the current vehicle is in the motion form.

In some embodiments, the constraint condition may include at least one of the following:

c1: a speed of the current vehicle≥a set speed threshold and a current GPS position is the secure GPS position;

c2: $[Num(1)-Num(2)]/Num(2) \geq k3$; Num(1) denotes the count of the high precision GPS position in the secure GPS point set, Num(2) denotes the count of the valid point in the secure GPS point set, and k3 denotes a set probability threshold, and $0<k3<1$. For example, $k3=0.6$.

In some embodiments, the set speed threshold may be preset empirically by a person skilled in the art, e.g., 5 meters per second.

In some embodiments, the processor may determine the set speed threshold based on a roadway condition and the vehicle parameters. For example, if a traffic situation on a current roadway during a preset historical time period is more congested, the lower the speed of the vehicle is, the lower the value of the set speed threshold may be preset.

In some embodiments of the present disclosure, by considering the traffic congestion situation of the current roadway and the speed of the vehicle during the preset historical time period, it can avoid a situation that the vehicle is always determined as in a stationary state when the preset speed threshold being too large and thus not constructing a motion trajectory for a long period.

In some embodiments, the processor may, in response to determining the current vehicle is in the motion form, construct a motion trajectory of the current vehicle in conjunction with the GPS position in the secure GPS point set, and then empty the secure GPS point set and proceed to obtain the next GPS position.

Specifically, the processor may, in response to determining the current vehicle is in the motion form, smooth and connect GPS positions being valid points in the secure GPS point set in an order in which each of the GPS positions being the valid points is obtained, to obtain the motion trajectory of the current vehicle.

In some embodiments, the processor may also, in response to determining the current vehicle is in a stationary form, empty the secure GPS point set and then proceed to obtain the next GPS position.

In some embodiments, the processor may further, before determining whether the current vehicle satisfies the constraint condition, in response to determining a first time interval between a moment of acquiring the GPS position and a previous moment of constructing the motion trajectory of the current vehicle exceeds a first preset threshold, determine whether a second time interval between the moment of acquiring the GPS position and a previous moment when the current vehicle was in the motion form is less than a second preset threshold, and if the second time interval is less than the second preset threshold, the motion trajectory of the current vehicle may be constructed.

In some embodiments, the processor may determine the first preset threshold and the second preset threshold based on the roadway condition and the vehicle parameters. For example, when the roadway is more congested and the speed of the vehicle is slower during the preset historical time period, the processor may set the first preset threshold smaller and the second preset threshold larger.

In some embodiments, magnitudes of the first preset threshold and the second preset threshold may be independent of each other and do not affect each other.

In some embodiments of the present disclosure, based on a congestion of the current roadway and a speed of the current vehicle, the first preset threshold and the second preset threshold may be determined, and in response to determining the first time interval exceeds the first preset threshold and the second time interval is less than the second preset threshold, the motion trajectory of the current vehicle may be constructed, which can avoid cyclically acquiring the GPS position all the time when the traffic is congested and ensure the real-time nature of the motion trajectory.

In some embodiments, the processor may perform operation 316 or operation 317 correspondingly based on a judgment result of whether the current vehicle is in the motion form.

In 316, in response to determining the current vehicle is in the stationary form, emptying the secure GPS point set and proceeding to obtain the next GPS position.

In some embodiments, the processor may also, in response to determining the current vehicle is in the stationary form, directly empty the secure GPS point set and then proceed to obtain the next GPS position via the GPS receiver.

In some embodiments, the processor may also re-perform operation 310 after obtaining the next GPS position.

In 317, in response to determining the current vehicle is in the motion form, constructing the motion trajectory of the current vehicle in conjunction with the GPS position in the secure GPS point set, emptying the secure GPS point set, and obtaining the next GPS position.

In some embodiments, the processor may also, in response to determining the current vehicle is in the motion form, directly construct the motion trajectory of the current vehicle in conjunction with the GPS position in the secure GPS point set, and then empty the secure GPS point set and proceed to obtain the next GPS position.

In some embodiments, the processor may also re-perform operation 310 after obtaining the next GPS position.

In 318, in response to determining the GPS position is the secure GPS position, updating a count of an abnormal GPS position to 0, and then proceeding to obtain the next GPS position.

In some embodiments, the processor may also directly update the count of the abnormal GPS position to 0 in response to determining the GPS position is the secure GPS position, and then proceed to obtain the next GPS position. By setting the count of the abnormal GPS positions to 0, an episodic abnormal GPS position is eliminated, which avoids a malicious cycle of judging the GPS position, and the normal execution of the GPS position judgments is ensured.

In some embodiments, the processor may also re-perform operation 310 after obtaining the next GPS position.

In 319, in response to determining the GPS position is the abnormal GPS position, adding the count of the abnormal GPS position by 1 to determine whether the count of the abnormal GPS position is greater than or equal to a second set value.

In some embodiments, the second set value may be preset empirically for a person skilled in the art.

By setting the second set value, a correction condition for the datum point is clarified, avoiding invalid GPS records, and also ensuring the timely detection and correction of GPS drift.

In some embodiments, the processor may perform operation 320 or operation 321 based on a judgment result of whether the count of the abnormal GPS position is greater than or equal to the second set value.

In 320, in response to determining the count of the abnormal GPS position is greater than or equal to the second set value, clearing the datum point and then re-acquiring the datum point.

More content about how to re-acquire the datum point can be found in operation 510 to operation 550 and the related descriptions thereof.

In some embodiments, the processor, after reacquiring the datum point, may also re-perform operation 310 to acquire the datum point.

In 321, in response to determining the count of the abnormal GPS position is less than the second set value, proceeding to obtain the next GPS position.

In some embodiments, the processor, after acquiring the next GPS position, may also re-perform operation 310 to acquire the GPS position and determine whether the GPS position is the secure GPS position.

In 510, in response to determining the datum point doesn't exist currently, obtaining the GPS position and determining whether the GPS position is the secure GPS position.

More content about how to determine whether the GPS position is the secure GPS position can be found in operation 220 in FIG. 2 and the related descriptions thereof.

In 520, in response to determining the GPS position is the abnormal GPS position, setting a flag number to zero, and then proceeding to acquire the next GPS position.

More content about the abnormal GPS position can be found in operation 220 in FIG. 2 and the related descriptions thereof.

In some embodiments, the processor may also re-perform operation 510 after obtaining the next GPS position.

In 530, in response to determining the GPS position is the secure GPS position, storing the GPS position in the secure GPS point set, adding the flag number by 1, and determining whether the flag number is less than a third set value.

An initial value of the flag number may be 0. The third set value may be preset for a person skilled in the art based on experience. For example, the third set value may be 5.

In some embodiments, the processor may perform operation 540 or operation 550 based on a judgment result of whether the flag number is less than the third set value.

In 540, in response to determining the flag number is less than the third set value, proceeding to acquire the next GPS position.

In some embodiments, the processor may also re-perform operation 510 after obtaining the next GPS position.

In 550, in response to determining the flag number is greater than or equal to the third set value, determining a most recently acquired GPS position as the datum point.

In some embodiments, the processor may, in response to determining the flag number is greater than or equal to the third set value, determine a last acquired GPS position as the most recently acquired GPS position.

In some embodiments, the processor may perform operation 310 to operation 321 circularly based on a new datum point.

FIG. 4 is a flowchart illustrating determining a set count threshold according to some embodiments of the present disclosure. In some embodiments, FIG. 4 may be executed by a processor of the drift optimization system 100 for a vehicle-mounted machine based on a global positioning system (GPS).

In some embodiments, the processor may determine a set count threshold 430 based on environmental parameters 411, a roadway condition 412, and vehicle parameters 413 using a threshold prediction model 420.

More content about the environmental parameters 411, the roadway condition 412, and the vehicle parameters 413 can be found in FIG. 1 to FIG. 2 and the related descriptions thereof.

In some embodiments, the processor may further send a third command in response to resetting a datum point.

The third command may instruct a vehicular sensor and a camera unit to reacquire the environmental parameter, the vehicle parameters, or a count of vehicles in a preset range; and based on the count of vehicles in the preset range and the vehicle parameters, redetermine a roadway condition, and using a re-determined roadway condition as an input to the threshold prediction model to determine the set count threshold.

More content about how to determine the roadway condition can be found in operation 250 in FIG. 2 and the related descriptions thereof.

In some embodiments of the present disclosure, when the datum point is readjusted, a GPS position sequence may also be re-adjusted, and an environment around a current vehicle may change, and even after adjusting the datum point, the current vehicle may already be on another road. Therefore, it is necessary to reacquire the environmental parameters and the vehicle parameters, and input the environmental parameters and the vehicle parameters to the threshold prediction model for prediction, to ensure the accuracy of a prediction result of the threshold prediction model.

In some embodiments, the third command may further instruct the vehicular sensor and the camera unit to reacquire data of a set collection amount at a set collection accuracy to obtain the environmental parameters, the vehicle parameters, and the count of vehicles.

The collection accuracy may reflect an accuracy of data collected by the vehicular sensor and the camera unit.

The set collection amount may reflect a total amount of data that needs to be collected by the vehicular sensor and the camera unit, respectively.

In some embodiments, the processor may determine a collection accuracy and a collection amount based on a speed of a vehicle, the roadway condition, and a GPS reception frequency. For example, the slower the speed of the vehicle, the less congested the current roadway condition, and the less frequent the GPS reception frequency, the smaller collection amount and the larger collection accuracy may be set by the processor.

Understandably, the slower the speed of the vehicle, the more congested the current roadway, and the smaller the GPS reception frequency, correspondingly, the smaller count of times that the secure GPS point set is stored fully. At this time, a frequency to set the set count threshold for prediction is smaller, and the collection amount of the camera unit and the vehicular sensor is reduced, thereby saving resources and improving efficiency. Additionally, reducing the collection amount while improving the collection accuracy ensures the accuracy of acquired environmental parameters, acquired vehicle parameters, and acquired count of vehicles in the preset range.

In some embodiments, the threshold prediction model may be a machine learning model. In some embodiments, the threshold prediction model may be a neural network (NN) model or a deep neural network (DNN) model, or the like.

In some embodiments, the processor may obtain the threshold prediction model by training based on a training data set.

In some embodiments, the training data set may include a plurality of second training samples collected at a plurality of different historical time periods, with a count of the second training sample collected at each historical time period being greater than a preset sample count threshold.

In some embodiments, the plurality of different historical time periods may be a plurality of time periods in a day. For example, the plurality of different historical time periods may include a historical morning peak period, a historical evening peak period, and a historical off-peak period. Exemplarily, a morning peak period may include hours 08:00~09:00 and 09:00~10:00, and an evening peak period may include hours 16:00~17:00, 17:00~18:00 and 18:00~19:00, and the rest of the day may be an off-peak period.

In some embodiments, the preset sample count threshold may be preset empirically for a person skilled in the art.

In some embodiments, the preset sample count threshold may also correlate to an average value of horizontal accuracy factors and an average value of vertical accuracy factors of all GPS positions in the training data set. For example, the smaller the average value of the horizontal accuracy factors and the average value of the vertical accuracy factors, the smaller the preset sample count threshold.

In some embodiments, the training data set may further include a second label corresponding to each second training sample.

The second training sample may be obtained from historical data. The second label may be a set count threshold corresponding to the second training sample in the historical data. Specifically, the second label may be a set count threshold with the best subsequent correction effect in drift optimization corresponding to the second training sample in the historical data. More content about the best subsequent correction effect can be found in operation 250 in FIG. 2 and the related descriptions thereof.

Specifically, a specific training process of the threshold prediction model 420 may include operation 421 to operation 423 as follows.

In 421, obtaining the training data set;

In 422, performing a plurality of rounds of iterations, with at least one round of iterations including operation 4221 to operation 4223 as follows:

In 4221, selecting one or more second training samples from the training data set, inputting the one or more second training samples into an initial threshold prediction model, and obtaining a predicted output of an initial threshold prediction model corresponding to the one or more second training samples.

In 4222, based on the predicted output of the initial threshold prediction model corresponding to the one or more second training samples, and a second label of the one or more second training samples, introducing the predicted output and the second label into a formula of a predefined loss function, and calculating a value of the loss function;

In 4223, updating model parameters of the initial threshold prediction model inversely based on the value of the loss function. The inverse update may be performed using various manners. For example, the inverse update may be performed based on a gradient descent manner.

In 423, when an end-of-iteration condition is satisfied, end an iteration, obtaining a trained threshold prediction model.

The end-of-iteration condition may include that the loss function converges, a count of iterations reaches a threshold, etc.

In some embodiments of the present disclosure, the smaller the average value of the horizontal accuracy factors and the average value of the vertical accuracy factors is, the more accurate the GPS position is in training samples, and at this time, a count of training samples may be appropriately reduced to save the training cost of the threshold prediction model, and the training of the threshold prediction model may also be avoided from failing to converge.

Additionally, it is ensured that a count of training samples collected in each historical time period is larger than the preset sample count threshold, so that there is a sufficient count of training samples in both peak periods and off-peak period, and the diversity of training samples is guaranteed to ensure the accuracy of the threshold prediction model.

The above-described drift optimization system 100 for a vehicle-mounted machine based on a global positioning system (GPS) is hereinafter validated in conjunction with specific embodiments.

Only as an exemplary example, a first original trajectory to a fifth original trajectory may be to randomly select a bus each day from Sep. 1, 2022, to Sep. 5, 2022, obtain a GPS position of the bus, and draw a motion trajectory based on an original GPS position as an original trajectory. A first corrected trajectory to a fifth corrected trajectory may be after screening original GPS positions using a drift optimization method for a vehicle-mounted machine based on a global positioning system (GPS), draw amotion trajectory in conjunction with all valid GPS positions and record the motion trajectory as a correction trajectory. The first corrected trajectory to the fifth corrected trajectory may be trajectories that correspond to the first original trajectory to the fifth original trajectory in turn after correction.

Figure 5A:
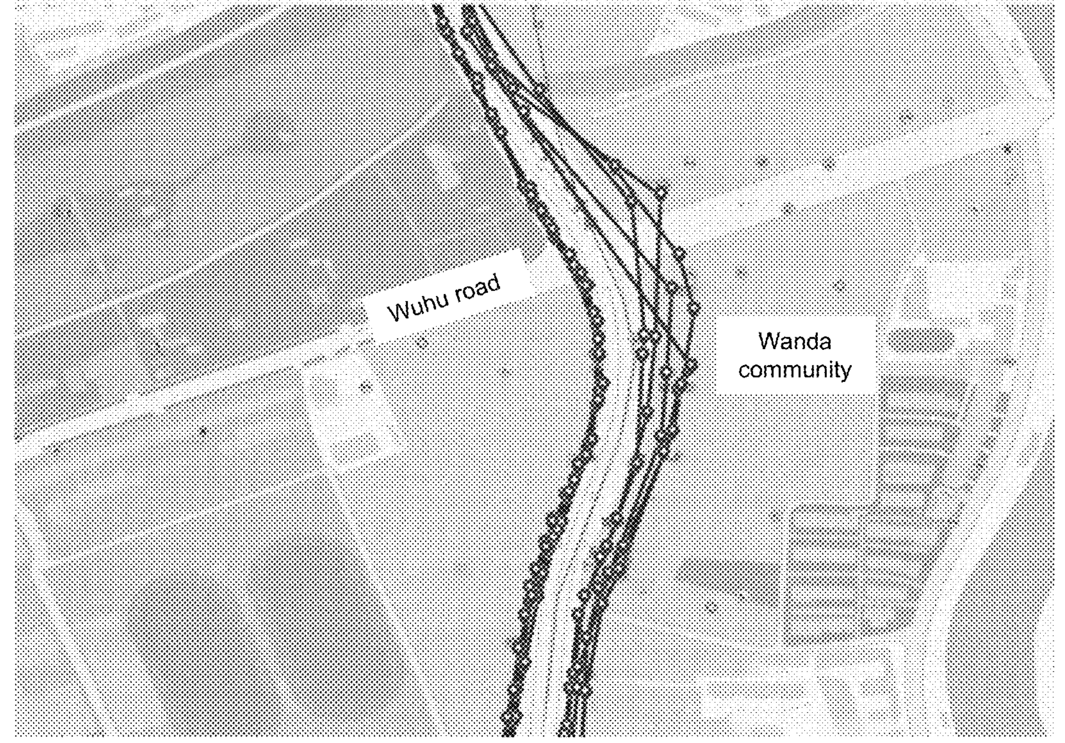
FIG. 5*a* is a diagram illustrating an exemplary first original trajectory according to some embodiments of the present disclosure.
Figure 5B:
FIG. 5*b* is a diagram illustrating an exemplary first corrected trajectory according to some embodiments of the present disclosure.
Figure 6A:
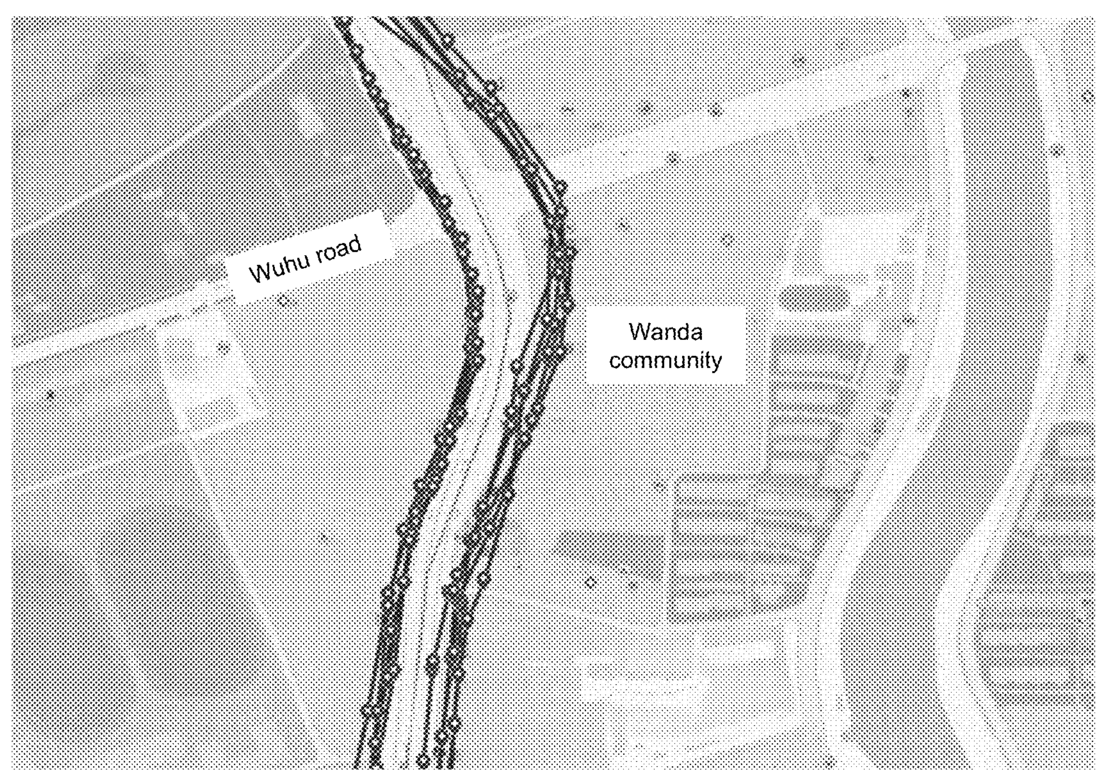
FIG. 6*a* is a diagram illustrating an exemplary second original trajectory according to some embodiments of the present disclosure.
Figure 6B:
FIG. 6*b* is a diagram illustrating an exemplary second corrected trajectory according to some embodiments of the present disclosure.

In this embodiment, data on a same road section was selected for validation on Sep. 1, 2022, and Sep. 2, 2022. Combined with FIG. 5*a* and FIG. 6*a*, it can be seen that on a curved road section, both the first original trajectory and the second original trajectory have a tendency to camber with respect to the road, and it can be seen that the original GPS position is prone to drifting toward the camber of the curve. Combining FIG. 5*b* and FIG. 6*b*, it can be seen that trends of the first corrected trajectory and a second corrected trajectory are consistent with the road, GPS drift points on the first original trajectory and the second original trajectory that are located on an outer convex side of the curve were corrected.

Figure 7A:
FIG. 7*a* is a diagram illustrating an exemplary third original trajectory according to some embodiments of the present disclosure.
Figure 7B:
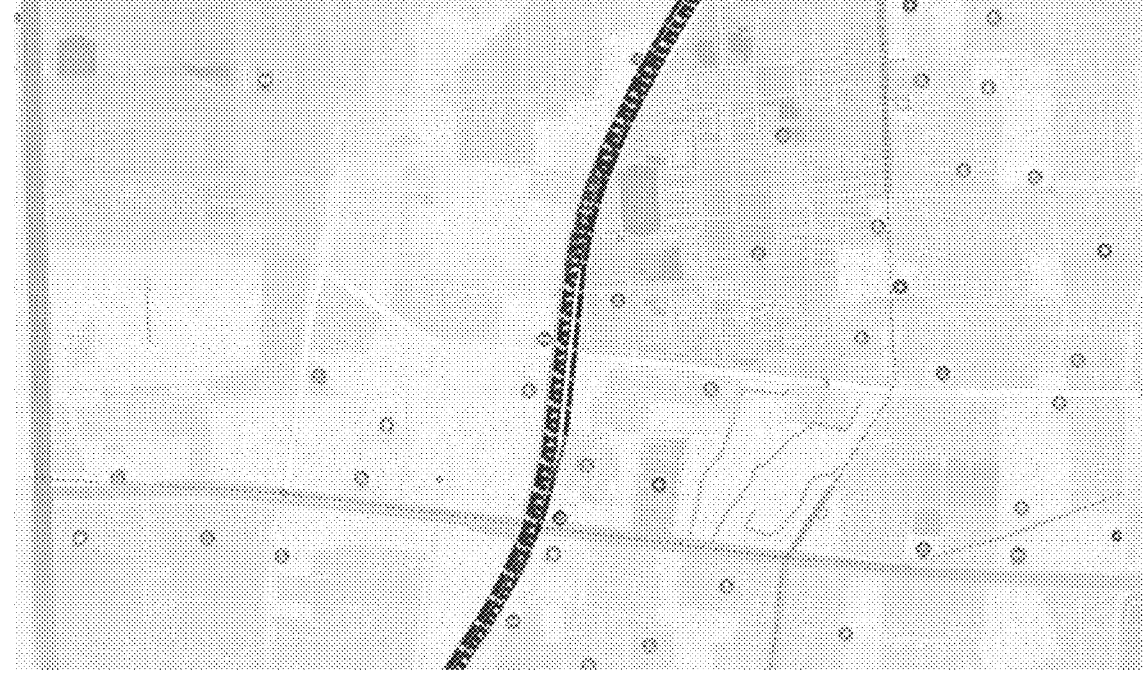
FIG. 7*b* is a diagram illustrating an exemplary third corrected trajectory according to some embodiments of the present disclosure.
Figure 8A:
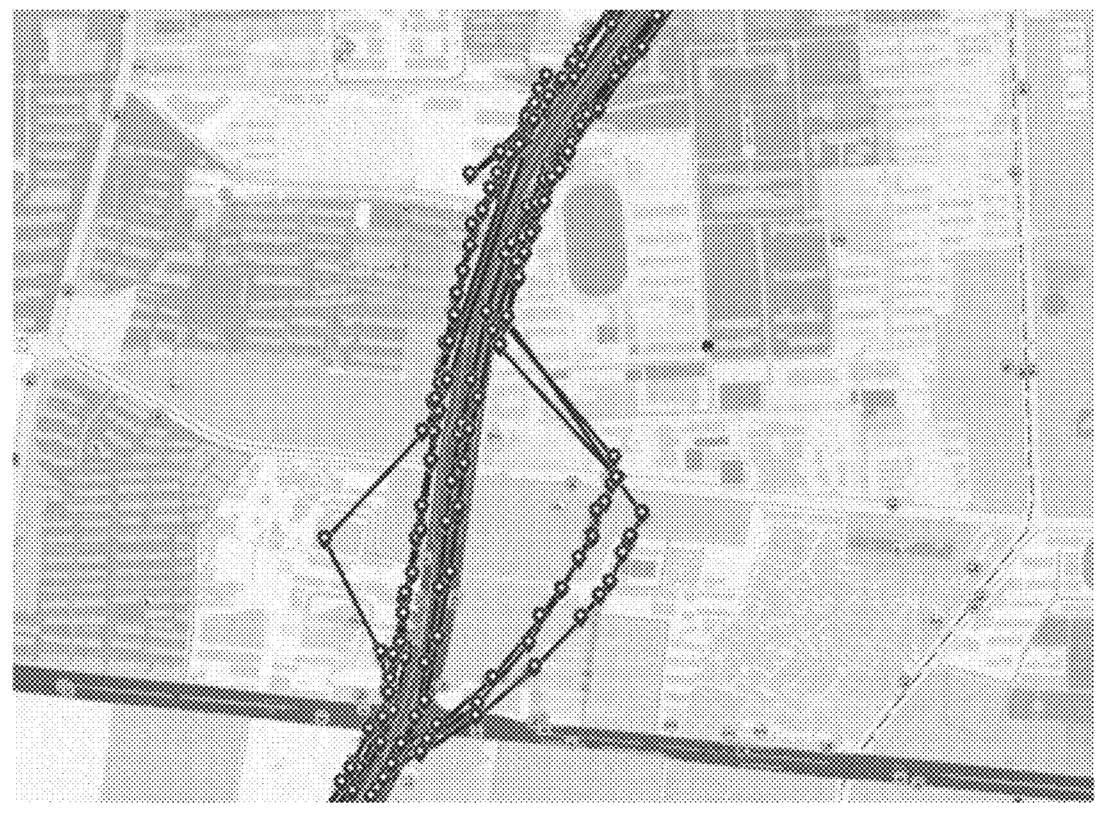
FIG. 8*a* is a diagram illustrating an exemplary fourth original trajectory according to some embodiments of the present disclosure.
Figure 8B:
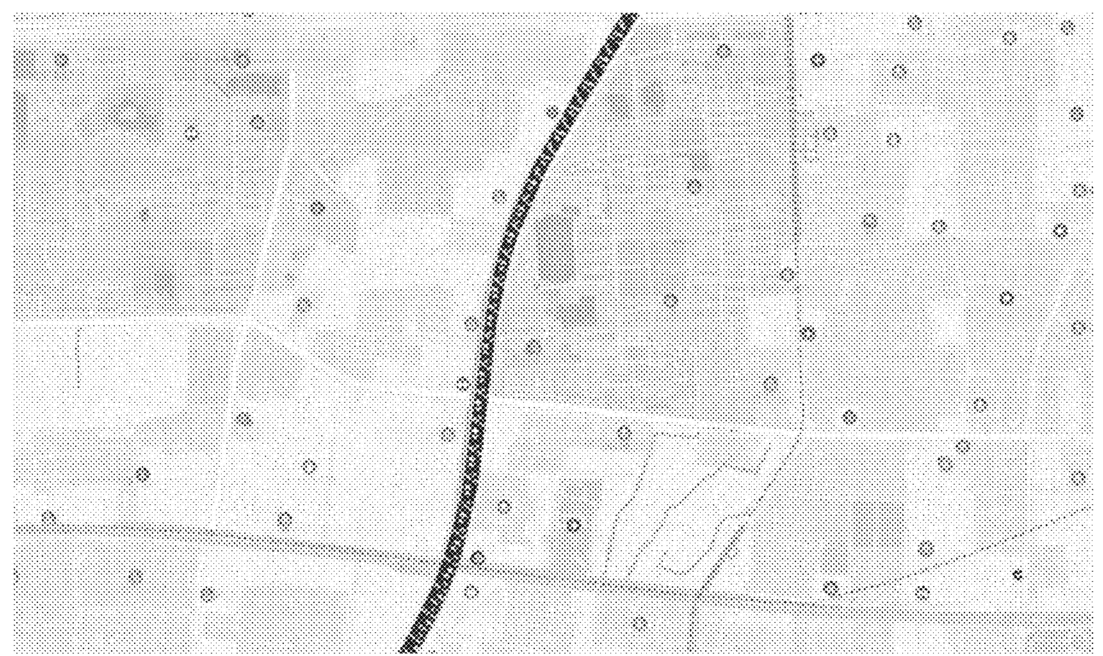
FIG. 8*b* is a diagram illustrating an exemplary fourth corrected trajectory according to some embodiments of the present disclosure.

In this embodiment, data on a same road section was selected for validation on Sep. 3, 2022, and Sep. 4, 2022. Combined with FIG. 7*a* and FIG. 8*a*, it can be seen that both a third original trajectory and a fourth original trajectory drifted unidirectionally with respect to the road on a road section that is adjacent to an intersection, which shows that the original GPS position was severely drifted on the road section that is adjacent to the intersection. FIG. 7 *b* and FIG. 8 *b* show that trends of a third corrected trajectory and a fourth corrected trajectory are consistent with the road, which corrects GPS drift points on the third original trajectory and the fourth original trajectory.

Figure 9A:
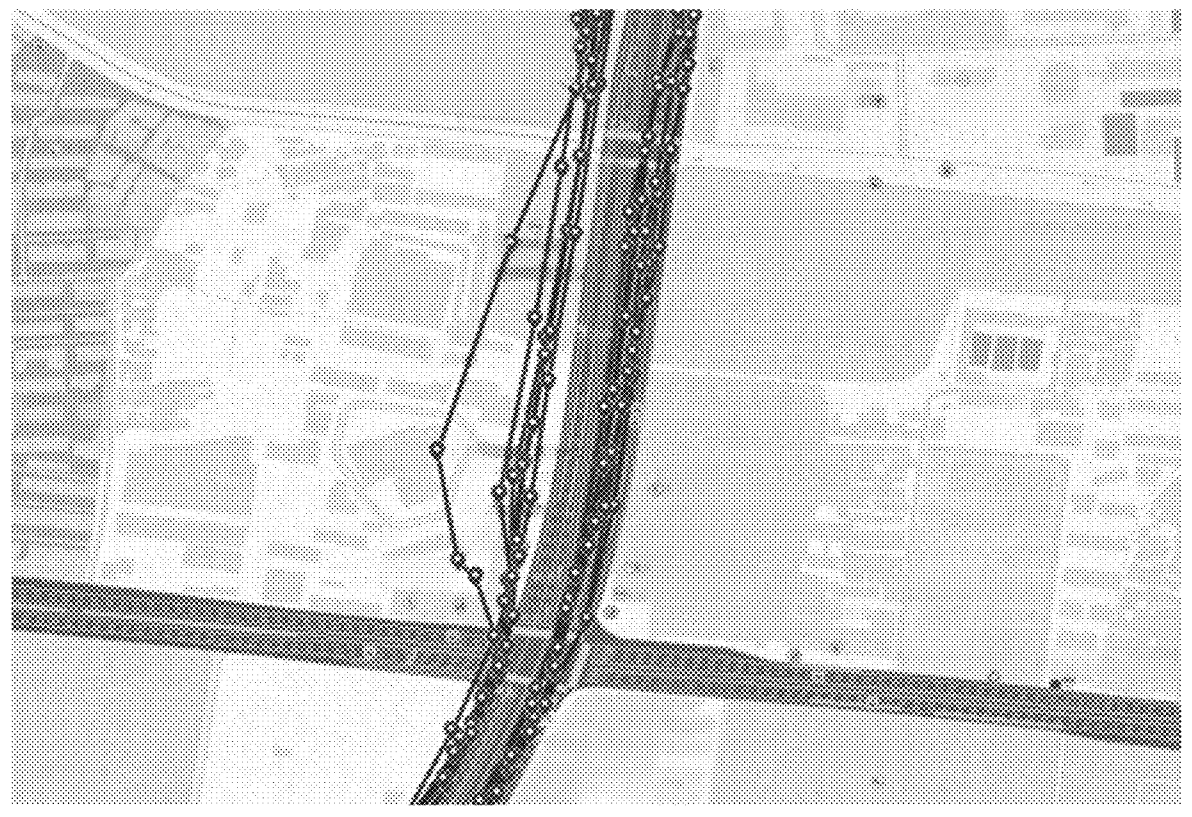
FIG. 9*a* is a diagram illustrating an exemplary fifth original trajectory according to some embodiments of the present disclosure.
Figure 9B:
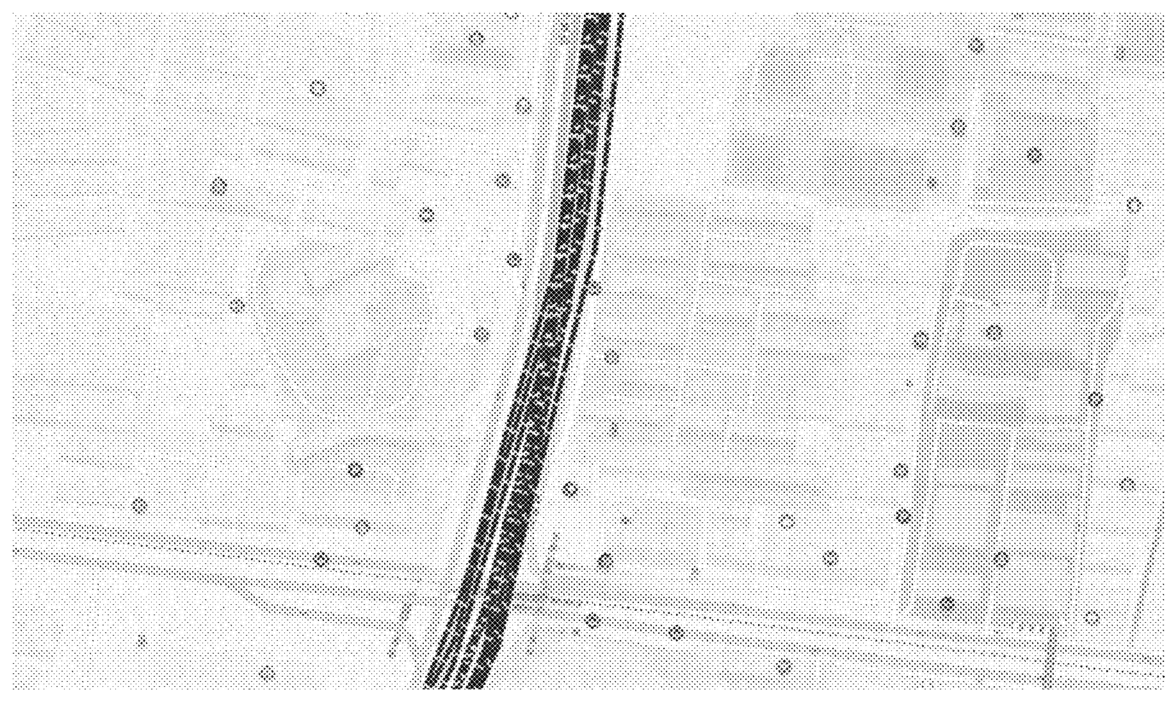
FIG. 9*b* is a diagram illustrating an exemplary fifth corrected trajectory according to some embodiments of the present disclosure.

In this embodiment, data on a road section was selected for validation on Sep. 5, 2022, as can be seen in conjunction with FIG. 9*a* and FIG. 9*b*, a fifth corrected trajectory completely removes position points on a fifth original trajectory that are drifted relative to a sudden change in road alignment and corrects GPS drift points on the fifth original trajectory.

As can be seen in conjunction with this embodiment, the drift optimization method for a vehicle-mounted machine based on a global positioning system (GPS) proposed by the present disclosure can adapt to any road conditions, and a corrected trajectory is fully compliant with a road trend, thereby achieving high-precision GPS drift optimization.

In this embodiment, a count of GPS points on each original trajectory and each corrected trajectory is shown in Table 1 below.

TABLE 1

Count of GPS points on original trajectory and corrected trajectory

| | Date | | | | |
|---|---|---|---|---|---|
| | 2022 Sep. 1 | 2022 Sep. 2 | 2022 Sep. 3 | 2022 Sep. 4 | 2022 Sep. 5 |
| Corrected trajectory | 3601 | 3694 | 3711 | 3654 | 3633 |
| Original trajectory | 3974 | 4001 | 4122 | 3897 | 3901 |

Combined with Table 1 and the accompanying drawings of the embodiment, it can be seen that the drift optimization system for a vehicle-mounted machine based on a global positioning system (GPS) may effectively remove drift points and achieve trajectory optimization.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

What is claimed is:

1. A drift optimization system for a vehicle-mounted machine based on a global positioning system (GPS), comprising a vehicular sensor, a camera unit, a GPS receiver, a memory, and a processor of a current vehicle, wherein the vehicular sensor is configured to obtain environmental parameters and vehicle parameters;

the camera unit is configured to obtain the environmental parameters and a count of vehicles in a preset range;

the GPS receiver is configured to receive a navigation signal sent by a navigation satellite;

the memory is configured to store a secure GPS point set and intermediate data generated during drift optimization; and the processor is communicatively connected with the vehicular sensor, the camera unit, the GPS receiver, and the memory, and the processor is configured to:

set a datum point;

determine a classification result of a GPS position by judging each GPS position in a GPS position sequence acquired from the GPS receiver during a preset time period, the classification result including at least one of a secure GPS position, a high precision GPS position, or an abnormal GPS position;

in response to determining that the GPS position is the secure GPS position, send a first command, the first command instructing the memory to store the GPS position to the secure GPS point set;

in response to determining that the GPS position is the abnormal GPS position and all first N1-1 GPS positions prior to the GPS position in the GPS position sequence are abnormal GPS positions, reset the datum point; wherein N1 is a preset value;

in response to detecting that the secure GPS point set in the memory is full, determine whether a count of the high precision GPS position in the secure GPS point set is greater than or equal to a set count threshold;

in response to determining that the count of the high precision GPS position in the secure GPS point set is greater than or equal to the set count threshold, construct a motion trajectory of the current vehicle based on the GPS position in the secure GPS point set; and in response to determining that the count of the high precision GPS position in the secure GPS point set is less than the set count threshold, send a second command and reset the datum point, and the second command is configured to instruct the memory to empty the secure GPS point set.

2. The drift optimization system of claim 1, wherein a horizontal accuracy factor of the secure GPS position is less than k1 and a count of associated satellites of the secure GPS position is greater than n1, and a horizontal accuracy factor of the high precision GPS position is less than k2 and the count of associated satellites of the high precision GPS position is greater than n2, and $0<k2<k1$, $0<n1<n2$.

3. The drift optimization system of claim 1, wherein the processor is further configured to:

in response to determining the datum point exists currently, obtain the datum point and the GPS position, and determine whether the GPS position is the secure GPS position;

in response to determining that the GPS position is the secure GPS position, add the GPS position to the secure GPS point set, and determine whether the secure GPS point set is full of storage;

in response to determining that the secure GPS point set is not full of storage, proceed to obtain a next GPS position;

in response to determining that the secure GPS point set is full of storage, determine whether the count of the high precision GPS position in the secure GPS point set is greater than or equal to a first set value;

in response to determining that the count of the high precision GPS position in the secure GPS point set is less than the first set value, clear the datum point, empty the secure GPS point set, and reacquire the datum point; and in response to determining that the count of the high precision GPS position in the secure GPS point set is greater than or equal to the first set value, determine whether the current vehicle is in a motion form;

in response to determining that the current vehicle is in a stationary form, empty the secure GPS point set, and proceed to obtain the next GPS position; and in response to determining that the current vehicle is in the motion form, construct the motion trajectory of the current vehicle in conjunction with the GPS position in the secure GPS point set, empty the secure GPS point set, and proceed to obtain the next GPS position;

in response to determining that the GPS position is the secure GPS position, update a count of the abnormal GPS position to 0, and then proceed to obtain the next GPS position; and in response to determining that the GPS position is the abnormal GPS position, add the count of the abnormal GPS position by 1, and determine whether the count of the abnormal GPS position is greater than or equal to a second set value;

in response to determining that the count of the abnormal GPS position is greater than or equal to the second set value, clear the datum point and reacquire the datum point; and in responding to determining that the count of the abnormal GPS position is less than the second set value, proceed to obtain the next GPS position.

4. The drift optimization system of claim 3, wherein the processor is further configured to:

count a GPS position whose distance from the datum point is within a distance threshold in the secure GPS point set and determine the GPS position as a valid point; determine whether the current vehicle satisfies a constraint condition; and in response to determining that the current vehicle satisfies the constraint condition, determine that the current vehicle is in the motion form.

5. The drift optimization system of claim 4, wherein the constraint condition includes at least one of:

c1: a speed of the current vehicle being greater than or equal to a set speed threshold and a current GPS position being the secure GPS position; and c2: [Num(1)−Num(2)]/Num(2)≥k3; wherein Num(1) denotes the count of the high precision GPS position in the secure GPS point set, Num(2) denotes a count of the valid point in the secure GPS point set, and k3 denotes a set probability threshold, and 0<k3<1.

6. The drift optimization system of claim 4, wherein the processor is further configured to:

in response to determining that the current vehicle is in the motion form, construct the motion trajectory of the current vehicle in conjunction with the GPS position in the secure GPS point set, empty the secure GPS point set, and proceed to obtain the next GPS position; and in response to determining that the current vehicle is in the stationary form, empty the secure GPS point set, and proceed to obtain the next GPS position.

7. The drift optimization system of claim 4, wherein the processor is further configured to:

determine a set speed threshold based on a roadway condition and the vehicle parameters.

8. The drift optimization system of claim 4, wherein the processor is further configured to:

before determining whether the current vehicle satisfies the constraint condition, in response to determining that a first time interval between a moment of obtaining the GPS position and a previous moment of constructing the motion trajectory of the current vehicle exceeds a first preset threshold, determine whether a second time interval between the moment of obtaining the GPS position and a previous moment when the current vehicle was in the motion form is less than a second preset threshold, and in response to determining that the second time interval is less than the second preset threshold, construct the motion trajectory of the current vehicle.

9. The drift optimization system of claim 4, wherein the processor is further configured to:

determine whether the GPS position is the valid point based on a fluctuation degree of the GPS position, a preset fluctuation threshold, and the environmental parameters.

10. The drift optimization system of claim 9, wherein the preset fluctuation threshold includes a horizontal fluctuation threshold and a vertical fluctuation threshold, and the processor is further configured to:

determine the horizontal fluctuation threshold and the vertical fluctuation threshold based on the environmental parameters.

11. The drift optimization system of claim 3, wherein the processor is further configured to:

in response to determining that the datum point does not exist currently, obtain the GPS position, and determine whether the GPS position is the secure GPS position;

in response to determining that the GPS position is the abnormal GPS position, set a flag number to zero, and proceed to obtain the next GPS position;

in response to determining that the GPS position is the secure GPS position, store the GPS position in the secure GPS point set, add the flag number by 1, and determine whether the flag number is less than a third set value;

in response to determining that the flag number is less than the third set value, proceed to obtain the next GPS position; and in response to determining that the flag number is greater than or equal to the third set value, designate a most recently obtained GPS position as the datum point, and an initial value of the flag number is 0.

12. The drift optimization system of claim 1, wherein the processor is further configured to:

for each GPS position obtained from the GPS receiver during the preset time period:

determine the classification result of the GPS position based on a horizontal accuracy factor, a count of associated satellites, a vertical accuracy factor, and the environmental parameters of the GPS position.

13. The drift optimization system of claim 1, wherein the processor is further configured to:

determine the set count threshold based on the environmental parameters, a roadway condition, and the vehicle parameters using a threshold prediction model, the threshold prediction model being a machine learning model.

14. The drift optimization system of claim 13, wherein the threshold prediction model is obtained by training based on a training dataset, the training dataset includes a plurality of second training samples collected in a plurality of different historical time periods, a count of training samples collected during each of the plurality of different historical time periods is greater than a preset sample count threshold, and the preset sample count threshold is related to an average value of horizontal accuracy factors and an average value of vertical accuracy factors of all GPS positions in the training dataset.

15. The drift optimization system of claim 13, wherein the processor is further configured to:

in response to resetting the datum point, send a third command, the third command instructing the vehicular sensor and the camera unit to reacquire the environmental parameters, the vehicle parameters, and the count of vehicles in the preset range; and redetermine the roadway condition based on a reacquired count of vehicles in the preset range and reacquired vehicle parameters.

16. The drift optimization system of claim 1, wherein the environmental parameters include a roadway slope, and the vehicular sensor includes an incline sensor, the incline sensor being configured to obtain the roadway slope.

17. The drift optimization system of claim 1, wherein the processor is further configured to:

determine a capacity of the secure GPS point set based on the vehicle parameters, a roadway condition, a distance between adjacent GPS positions in the GPS position sequence, and the environmental parameters.

18. The drift optimization system of claim 17, wherein the processor is further configured to:

determine the capacity of the secure GPS point set based on the vehicle parameters, the roadway condition, the distance between the adjacent GPS positions in the GPS position sequence, and the environmental parameters using a capacity prediction model, the capacity prediction model being a machine learning model.

19. The drift optimization system of claim 18, wherein an input of the capacity prediction model includes a fluctuation degree of the GPS position sequence.

20. The drift optimization system of claim 1, wherein the processor is further configured to:

for every preset period, generate a fourth command and send the fourth command to the camera unit based on a GPS reception frequency, a roadway condition, and the environmental parameters, the fourth command adjusts the camera unit to obtain the environmental parameters at a preset monitoring frequency, wherein the fourth command includes the preset monitoring frequency, the preset monitoring frequency is determined based on an initial monitoring frequency and an adjustment amount of a monitoring frequency in a current cycle, and the adjustment amount of the monitoring frequency in the current cycle is determined based on a road curvature and a density of environmental obstacles obtained by the camera unit in a previous cycle.

* * * * *